United States Patent [19]

Powers

[11] 4,188,098
[45] Feb. 12, 1980

[54] PHOTOGRAPHIC FILM CASSETTE HAVING BOWED SPRING WITH DEVICE PREVENTING OVERSTRESSING OF SPRING

[75] Inventor: Sheldon D. Powers, Stoneham, Mass.

[73] Assignee: Polaroid Corporation, Cambridge, Mass.

[21] Appl. No.: 26,908

[22] Filed: Apr. 4, 1979

[51] Int. Cl.² ............................................. G03C 11/00
[52] U.S. Cl. ................................. 352/130; 352/221; 354/85; 354/88
[58] Field of Search ........................ 352/130, 72, 221; 354/83, 84, 85, 88

[56] References Cited

U.S. PATENT DOCUMENTS

| | | | |
|---|---|---|---|
| 3,707,116 | 12/1972 | Gold | 354/84 |
| 3,798,669 | 3/1974 | Bachelder | 354/85 |
| 3,895,862 | 7/1975 | Stella et al. | 352/130 |
| 3,951,530 | 4/1976 | Czumak et al. | 352/130 |
| 4,016,582 | 4/1977 | Wareham | 354/83 |

*Primary Examiner*—Monroe H. Hayes
*Attorney, Agent, or Firm*—Leslie J. Payne

[57] ABSTRACT

A photographic film cassette having a bowed spring yieldably biasing a pressure pad for supporting a film strip so that the latter is held in sliding engagement with a fluid processor nozzle. Spring support members formed on the cassette housing wall support opposing ends of the bowed spring so as to longitudinally position it, as well as engage other spring portions during spring deflection to prevent overstressing of the spring. The invention embodies a method of preventing overstressing of the deflected bowed spring while facilitating an increase in the spring force after a preselected deflection thereof.

9 Claims, 5 Drawing Figures

PHOTOGRAPHIC FILM CASSETTE HAVING BOWED SPRING WITH DEVICE PREVENTING OVERSTRESSING OF SPRING

BACKGROUND OF THE INVENTION

In general, this invention relates to photographic film cassettes and, more particularly, an improved pressure pad spring and cassette arrangement therefor which avoids diminishing spring effectiveness and improves overall cassette assembly.

Multipurpose film cassettes have been developed in which a strip of photographic film is operated so as to be exposed, processed and projected without leaving the cassette. Film cassettes of this type are disclosed in several U.S. patents assigned in common with the present invention.

In film cassettes of this category, a supply of light sensitive photographic film can be selectively exposed in a camera particularly adapted to receive and operate the cassette. To process or develop the exposed film, the cassette is removed from the camera and placed in a player or processing and viewing apparatus capable of activating a cassette contained processor for depositing a desired uniform layer of processing fluid on the film's exposed emulsion surface. During such processing a conventional series of successive, positive transparent images on the exposed film is developed. Following processing in the manner indicated, the player apparatus is operated as a projector. During projection, the film is incrementally advanced, frame-by-frame, past a light source. Accordingly, the series of positive transparent images of the scenes to which the film were exposed are capable of being successively viewed while being projected onto a screen.

Towards the end of achieving the desired and critical fluid thickness on the film strip, as well as for avoiding blemishes in the developed transparent images, the cassette contains a spring-biased pressure pad yieldably supporting the film strip between the pad and a fluid processor nozzle structure.

The current state-of-the art with respect to achieving this uniform and substantially blemish free coating is represented by the disclosure of U.S. Pat. No. 3,951,530 issued Apr. 20, 1976 to Frank M. Czumak, Paul B. Mason and Joseph A. Stella, which patent is commonly assigned with the present invention. In the disclosure of this patent, the film's emulsion surface is yieldably urged into sliding engagement with the processor nozzle so that a uniform and predetermined gap exists between the emulsion surface and a doctoring surface formed on the nozzle. Formation of the desired fluid thickness is effected after the fluid has been deposited onto the film and passes the doctoring surface positioned downstream, in the direction of film advancement during processing, of a nozzle opening. This formation is facilitated by the doctoring surface being configured to develop positive hydrodynamic pressures in the deposited fluid which force the film strip into sliding engagement with the pressure pad. To resist this tendency, the pressure pad spring must be constructed to retain the desired gap spacing despite the presence of these hydrodynamic pressures. Also, the biasing force of the spring is selected to provide a net balance of forces on the film strip. This is accomplished by selecting the spring biasing force to be substantially equal and opposite to the hydrodynamic pressures. As a result foreign particles, such as dust or the like, on the emulsion surface of the film will effect a slight instantaneous increase in the gap between the doctoring surface and such emulsion surface and be permitted to pass therebeneath. Consequently, foreign particles will not be trapped and the possibility of blemishes occurring on the developed film is substantially eliminated, it being understood that these particles, in themselves, are inconsequential to either processing or developing because of their minute size. It will be appreciated, therefore, the spring force of the spring must be carefully controlled, otherwise the foregoing functions of the spring will result in significant operational problems. The type of spring described in the foregoing identified patent, which is the kind typically used in cassettes of this category, is a thin leaf spring having one end staked to the cassette, and the other end contacting and biasing the pressure pad. While the leaf spring performs satisfactorily there is potential for problems arising from the fact that the spring can be overstressed and thereby have adversely altered the noted preselected biasing force. Usually the problems of overstressing arise by virtue of the cassette assembly operations wherein an operator must periodically bend and thereby possibly overstress the spring in order to produce the completed film cassette. Aside from this potential problem use of the conventional leaf spring in its present embodiment necessitates relatively costly assembly procedures because of the staking operation.

It follows, therefore, that avoidance of overstressing the spring biasing the pressure pad during assembly is a major focal point of attention to overall film cassette development.

Moreover, the potential of the foregoing problems is further compounded by the requirement the cassette and its components including the pressure pad spring must be capable of mass production manufacturing techniques as well as be within tolerance levels incident to such techniques for the system to be acceptable in a competitive commercial market. Accordingly, the structural organization of components by which the film is supported in predetermined relationship to the doctoring surface is important to the overall system.

SUMMARY OF THE INVENTION

In accordance with the present invention, the potential for problems associated with adverse variations in the spring rate of the pressure pad spring caused by overstressing usually arising from assembling operations of the same is substantially eliminated. Elimination is brought about by the provision of an improved pressure pad spring and arrangement thereof with a film cassette.

As in prior film cassettes, there is a housing containing a strip of film and a forming device for facilitating formation of a generally uniform processing fluid layer on a given film surface during travel of the film therepast in a given direction. Spaced relative to the forming means is pressure pad which is capable of supporting successive incremental portions of the film strip in a predetermined spaced relationship to the forming means. As a result the desired fluid processing thickness is attainable.

To an illustrated embodiment of this invention, there is provided a deflectable, generally bowed spring engaging with and biasing the pressure pad toward the forming means with a predetermined minimum biasing force for supporting the strip in the noted predetermined relationship.

Also in such embodiment there are provided means for supporting opposite end portions of the spring which are positioned for operative engagement with other portions of said spring upon a predetermined amount of deflection of the other portions for substantially preventing overstressing of the spring during cassette assembly to thereby preclude substantially altering the predetermined minimum biasing force. Moreover, another embodiment has the spring supporting means provided with means for rapidly increasing the biasing force of the spring after deflection of other portions of said spring beyond said predetermined amount.

Among the objects of the invention are, therefore, the provision of an improved pressure pad spring arrangement for film strips contained in multipurpose film cassette for substantially eliminating overstressing of the spring; and the provision of an improved method of preventing overstressing of the pressure pad spring while facilitating an increase in the spring biasing force in response to a predetermined deflection.

Other objects and further scope of applicability of the present invention will become apparent from the detailed description to follow when taken in conjunction with the accompanying drawings in which like parts are designated by like reference numerals.

DETAILED DESCRIPTION OF A PREFERRED EMBODIMENT

Figure 1:
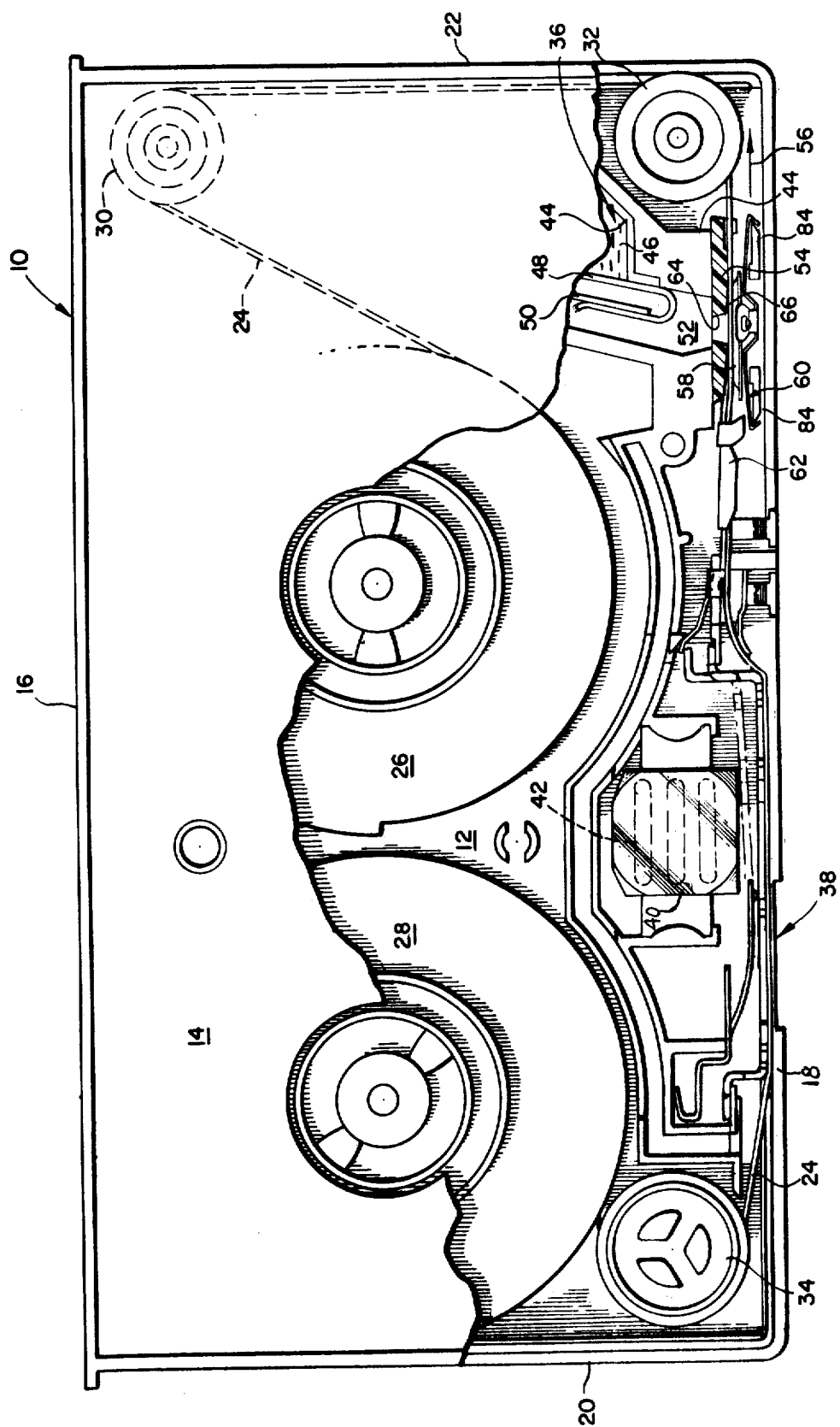
FIG. 1 is a side elevation view, partially broken away, illustrating the interior of a film cassette incorporating the improvements of the present invention.

In FIG. 1 of the drawings, a multipurpose film cassette incorporating the principles of the present invention is shown to include a housing 10 taking the form of a rectangular parallelepiped having a pair of exterior side walls 12 and 14 connected together by top, bottom and end walls 16, 18, 20 and 22, respectively. Within the housing 10, a film strip 24 is connected at opposite ends to supply and take-up spools 26 and 28, respectively, for movement through a series of linear flights or runs defined by a bobulator roller 30, an idler or guide roller 32 and a snubber roller 34. When the film strip 24 runs between the guide roller 32 and snubber roller 34, in passing from the supply spool 26 to the take-up spool 28, it traverses a processor 36 and an exposure/projection aperture 38 formed in the bottom housing wall 18 under a reflecting prism 40 located adjacent ventillating openings 42 in the side wall 12.

Included in the processor 36 is a reservoir or pod 44 of processing fluid 46 initially sealed by a tear strip 48 which is connected to a film strip engaging pull strip 50. It is pointed out that the construction and operation of the pull strip 50 is adequately disclosed in U.S. Pat. No. 3,895,862 issued July 22, 1975 to Joseph A. Stella et al., which patent is commonly assigned with the present application. Therefore, the pull strip 50 need not be further described herein except to note that upon initiation of a processing cycle, it becomes engaged by an aperture (not shown) in the end portion of the film strip 24 to peel the tear strip 48 away from the pod or reservoir 44. As a result, the processing fluid 46 is allowed to flow into a chamber 52 closed at its bottom by an applicator nozzle structure 54. At the completion of the tear strip removal operation, the pull strip 50 becomes wound between the convolutions of the film strip 24 on the supply spool 26, whereas the tear strip 48 becomes separated.

Also, in accordance with the disclosures of prior patents, including the one mentioned above, as the film strip 24 runs between the rollers 32 and 34, it passes between the bottom of the nozzle 54 and a pressure pad 58 biased upwardly by the bowed spring 60 of the present invention. Positioned upstream of the nozzle 54 (in the context of film strip travel during rewinding or processing, as indicated in FIG. 1 by arrow 56) is a valve member 62 engageable by a necked-down portion (not shown) in the leading end portion of the film strip 24 so as to be advanced from the position shown to a position (not shown) underlying the nozzle 54 at the end of the processing cycle.

An understanding of the nozzle 54 and its use in operation may be gained by continued reference to the drawings and, in particular, FIG. 1. In this embodiment, the nozzle 54 is an integral molding of suitable synthetic resinous material. Extending from top to bottom through the nozzle 54 is a generally rectangular shaped nozzle opening 64 through which the processing fluid 46 is deposited onto the upper surface of an emulsion layer E carried by and extending across the width of the film strip 24.

With continued reference to FIG. 1, it will be seen that the nozzle 54 is formed with a doctoring surface 66 shown to be located downstream of the nozzle opening 64; as viewed in the context of film strip advancement in the processing or rewind direction 56. In the illustrated embodiment, the doctoring surface 66 extends from a leading edge, adjacent the downstream edge of the nozzle opening 64, to a trailing edge terminating above the emulsion layer E by a preselected distance (not shown). This spacing effects formation of the uniform processing fluid coating.

Figure 2:
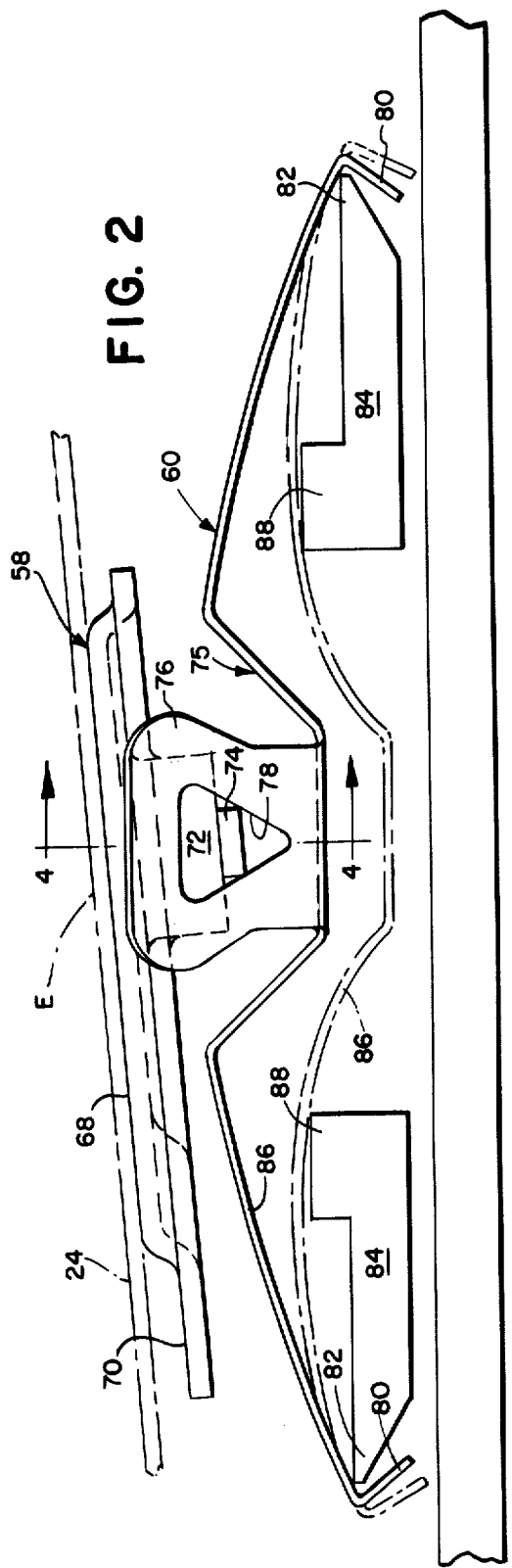
FIG. 2 is an enlarged side elevation view, partially in cross section, showing the cooperation between the improved pressure pad and pressure pad spring.
Figure 4:
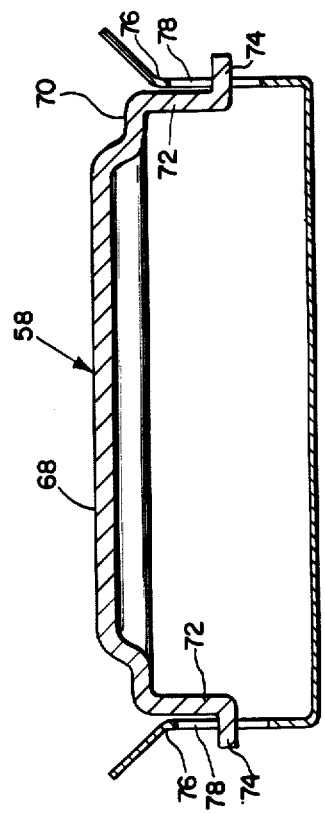
FIG. 4 is a cross section view substantially taken along the section line 4—4 appearing in FIG. 2 and looking in the direction of the arrows.
Figure 3:
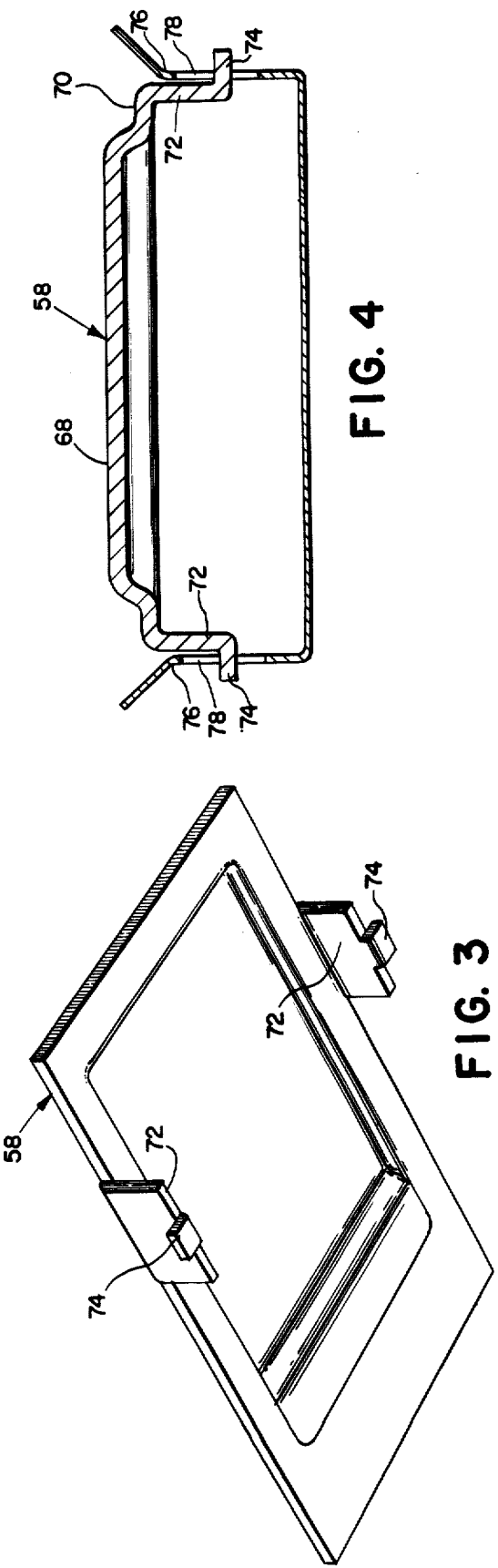
FIG. 3 is an enlarged perspective view of an improved pressure pad of this invention.

Referring back to the pressure pad 58 only those features necessary for an understanding of the invention will be discussed. In this regard, as best shown in FIGS. 2 to 4, the pressure pad 58 includes a film supporting surface 68 extending upwardly from a generally planar surface 70 so as to support the incremental length of the film strip 24 passing by the doctoring surface 66. Depending from opposite longitudinal sides of the pressure pad 58 are latches 72, each having an outwardly projecting finger 74 constructed to operatively cooperate with the bowed spring 60 in a manner to be described more completely.

Reference is now made to FIG. 2 for better showing the bowed spring 60. Extending upwardly from a concave central portion 75 of the bowed spring 60 is a pair of generally parallel, spaced apart, and outwardly bent force transmitting tabs 76 having triangular slots 78. In the assembled condition, each finger 74 is in firm engagement with the tab wall defining the slot 78. It has been determined that the foregoing construction provides effective means coupling together the pressure pad 58 and the bowed spring 60 so as to limit longitudinal displacement therebetween. This arrangement facilitates assembly of a spring and pressure pad subassembly. Accordingly, the biasing force of the bowed spring 60 is directly transmitted upwardly to the pressure pad 58 and the film strip 24. By reason of the central portion concavity 75, a space saving connection between the bowed spring 60 and the pressure pad 58 is provided.

For insuring that the emulsion layer E of the film strip 24 is engaged slidably against the nozzle 54, the biasing force of the bowed spring 60 is selected to be essentially equal to and opposite the hydrodynamic force developed by the processing fluid 46 flowing beneath the doctoring surface 66. As a result, a net balance of force acts on the film strip 24. In this manner, foreign particles, such as dust or the like on the surface of the emulsion layer E, which may otherwise be trapped and accumulate at a trailing edge of the doctoring surface 66, will effect a slight instantaneous increase in the gap between the trailing edge of the doctoring surface and the emulsion layer. Thus, this gap allows these foreign particles to pass along with the processing fluid coating.

Opposite end portions of the bowed spring 60 are formed with clasping portions 80. These clasping portions 80 are configured and dimensioned for releasably engaging corresponding end portions 82 of a pair of spaced apart supporting members 84. The supporting members 84 extend inwardly from the side wall 12 so as to longitudinally retain the spring 60 in its mounted condition. It is pointed out that the clasping portions 80 are, in their normal unflexed condition, spaced apart from each other by a distance less than the end portions 82 are spaced from each other. Thus to mount the bowed spring 60, it has to be flexed so that the clasping portions 80 are able to engage the opposite end portions 82. Accordingly, the bowed spring 60 is retained by its inherent resiliency. This arrangement is advantageous since the bowed spring 60 need not be staked, but rather only a quick manual assembly thereof is required. However, once a load is placed on the bowed spring 60, then the clasping portions 80 are moved to the solid line position depicted in FIG. 2. As this occurs, the underside surface 86 of the bowed spring 60 slides along the top of the end portions 82. Although not shown the supporting members 84 may have a top surface with a configuration matching the arcuate configuration of the underside surface 86 and the end portions 82 may have an extension which would engage with the underside surface of the supporting members so as to facilitate positioning of the spring.

To prevent overstressing of the bowed spring 60 due to it being deflected beyond its yield point, as might occur during cassette assembly, the supporting members 84 are constructed and positioned to appropriately control spring deflection by having the spring bottom out prior to reaching its yield point. Toward this end then, the underside surface 86 of the spring 60 when deflected engages a pair of spring contacting bosses 88, such as shown by phantom lines in FIG. 2. Consequently the effective length of the span of the bowed spring 60 is reduced. In this embodiment, the effective length of the spring 60, which is the span between the contacting bosses 88, is reduced by approximately one-half. Such reduction has the effect of doubling the spring force available to the pressure pad. It is intended that the spring 60 be deflected by at least such an amount when the valve member 62 becomes interposed between the nozzle 54 and the pressure pad 60. This latter result is beneficial because the slide valve 62 would be tightly urged to seal nozzle opening 64 after the processing mode. Although the present embodiment discloses use of a spring contacting boss 88 on the supporting members 84, the supporting members could be formed without such bosses. Alternately, a single supporting member could be used to achieve the desired bottoming out function which insures that the deflection does not cause the spring to exceed its yield point. As a result, the noted predetermined biasing force of the bowed spring 60 remains effective for urging the pressure pad 58 and the film strip 24 into their desired positions despite being deflected during assembly. It will be appreciated that the supporting members 84 provide means for releasably engaging and supporting opposite end portions of the bowed spring 60 and for engaging other portions of the spring 60, upon a predetermined deflection thereof, for preventing overstressing of the spring and thereby preclude substantially altering the predetermined minimum biasing force provided thereby.

To provide a more complete understanding of the cooperation between the bowed spring 60 and the pressure pad 58, the overall operation of the cassette will be briefly explained. For exposing the film strip 24, the cassette housing 10 is placed in an appropriate camera (not shown) and the emulsion layer E is selectively exposed by incrementally advancing it past the aperture opening 38. To process the thus exposed film strip 24, the cassette housing 10 is removed from the camera and inserted into a specially constructed player apparatus (not shown) with means cooperable with various operating components of the cassette to selectively operate the same in an initial processing mode and then a series of projecting modes. In the processing mode, the player operates to rewind the film strip 24 so that the pull strip 50 becomes engaged, in a known manner, by the film strip 24 to thus peel the tear strip 48 away from the pod or reservoir 44. Consequently, the processing fluid 46 can flow through the nozzle opening 64 onto the emulsion layer E, whereby continued advancement of the film strip 24 past the doctoring surface 66 effects formation of a uniform layer of processing fluid.

Operation of the bowed spring 60 is believed apparent from the foregoing description. However to suplement the above, a brief description of its operation will be given. An noted, the bowed spring 60 has its spring force selected to be generally equal and opposite to the hydrodynamic force developed in the processing fluid 46 traveling beneath the doctoring surface 66 so that a net balance of force acts on the film strip 24. In this manner, the pressure pad 58 supports the film strip 24 in sliding engagement with the nozzle structure 54 and, of course, in the predetermined spaced relation to the doctoring surface 66 so as to achieve the desired thickness. Any trapping of foreign particles by the doctoring surface 66 causes the gap between the doctoring surface and the emulsion layer E to increase, thereby freeing any trapped particles.

By reason of the supporting members 84, the bowed spring 60 will not become accidentally overstressed during cassette assembly. This is due to the supporting members 84 causing the deflected bowed spring 60 to bottom out thereagainst during such deflecting. As a result of the bottoming out, the bowed spring 60 will not be deflected beyond its yield point, thereby enabling repeated use of such spring for providing the preselected biasing force.

Each of the contacting bosses 88 cooperates with the bowed spring 60 for not only preventing overstressing of the spring, but also for increasing the spring force. This is because the effective length of the spring 60 is shortened when the spring 60 engages both of the contacting bosses 88. Utilization of the available higher spring force is beneficial when the valve member 62 is advanced between the nozzle opening 64 and the pressure pad 58. It will be understood that the valve member 62 when so positioned (not shown) will cause the spring 60 to be deflected so as to engage the contacting bosses 88, whereby the corresponding reduction in the spring's effective length will increase the biasing force provided so that the nozzle opening 64 is more tightly sealed.

By reason of the foregoing construction, the bowed spring 60 will not be accidentally overstressed during cassette assembly procedures because of the bottoming out means provided by the supporting member. Moreover, the additional biasing force is available when spring 60 engages the contacting bosses 88. Moreover, the spring construction advantageously facilitates less expensive and complicated assembly insofar as staking of the typical cantilevered biasing spring has been eliminated and replaced by a simple manual step which simultaneously allows proper positioning of the pressure pad 58.

Thus, it will be appreciated that as a result of this invention an improved spring and pressure pad arrangement is provided for photographic film cassettes and by which the abovementioned objectives are completely fulfilled. Also, it will be apparent to those skilled in the art that modifications and/or changes may be made in the illustrated embodiment without departure from inventive concepts manifested thereby. Accordingly, it is expressly intended that the foregoing description is of a preferred embodiment only, not limiting, and that the true spirit and scope of the present invention be determined by reference to the appended claims.

What is claimed is:

1. In a film cassette having a housing containing a strip of film, forming means for facilitating formation of a processing fluid layer on a given film surface during travel of the film therepast in a given direction, a pressure pad biased towards said forming means so as to support successive incremental portions of the film strip in a predetermined relationship to said forming means, the improvement comprising:
    a deflectable, generally bowed shaped spring having end portions and an intermediate portion, said intermediate portion engaging and biasing said pressure pad toward said forming means with a predetermined minimum biasing force to support the strip in said predetermined relationship; and
    spring support means for engaging and supporting said opposite end portions, said support means having spring bearing surfaces being in spaced relationship to said intermediate portion for limiting deflection of said spring such that said spring does not become deflected to the point of becoming overstressed, thereby precluding substantially altering said predetermined minimum biasing force.

2. The cassette of claim 1 wherein said supporting means includes means for rapidly increasing the biasing force of said spring after a preselected deflection of said spring.

3. The cassette of claim 2 wherein said increasing means includes a pair of contacting members, each of said contacting members being formed on a corresponding one of said bearing surfaces so as to be in spaced relationship with one another and each of said contacting members being constructed and arranged to engage said intermediate portion upon deflection of said spring, whereby a span of said intermediate portion between said contacting members is shorter than a span of said intermediate portion between said end portions, whereby the effective length of the spring is shortened for facilitating an increase in the biasing force upon spring deflection.

4. The cassette of claim 3 wherein said spring has an unflexed condition wherein said end portions are spaced apart from each other by a distance less than a distance between corresponding engaging surfaces formed on said supporting members so that said spring must be flexed to enable said end portions to tightly and resiliently engage said spring engaging surfaces.

5. The cassette of claim 4 wherein the improvement further comprises means for coupling said spring to said pressure pad to retain them together.

6. The cassette of claim 5 wherein said coupling means includes a pair of spaced-apart tabs formed on said spring and having openings therein, and wherein said pressure pad includes a pair of spaced-apart connecting members, each of said connecting members configured and arranged to extend into said openings and have a tight engagement with said tabs.

7. The cassette of claim 6 wherein said spring has a generally U-shaped concavity portion and having said connecting tabs being affixed to said spring so as to extend from said concavity portion for defining a compact space saving construction.

8. In a film cassette having a housing containing a strip of film, forming means for facilitating formation of a processing fluid layer on a given film surface during travel of the film therepast in a given direction, a pressure pad biased towards said forming means so as to support successive incremental portions of the film strip in a predetermined relationship to said forming means, the improvement comprising:
    a deflectable, generally bowed shaped spring having end portions and an intermediate portion, said intermediate portion engaging and biasing said pressure pad toward said forming means with a predetermined minimum biasing force to support the strip in said predetermined relationship; and
    spring support means for engaging and supporting said opposite end portions, said support means having spring bearing surfaces in spaced relationship to said intermediate portion for initially limiting deflection of said spring by a preselected distance such that said spring does not become deflected to the point of becoming overstressed, thereby precluding substantially altering said predetermined minimum biasing force and for rapidly increasing the biasing force of said spring by permitting deflection of preselected portions of said spring by an amount exceeding said preselected distance, whereby whenever a valve member deflects the spring beyond said preselected distance the increased biasing force urges the valve upwardly with great force.

9. The method of supporting a strip of photographic film having an emulsion surface by a pressure pad as the film travels in a given direction in a photographic film cassette past forming means for facilitating forming a generally uniform layer of processing fluid on the emulsion surface as the film travels in said given direction whereby the pressure is yieldably supported so as to impart at least a predetermined minimum biasing force to the pressure pad and the film strip carried thereby to keep the strip in a preselected spaced relationship to the forming means by a deflectable, generally bowed shaped spring having opposite end portions connected to the film cassette with an intermediate portion spanning the end portions, the improvement comprising:

limiting deflection of the spring so as to substantially prevent overstressing of the spring during deflection whereby the predetermined minimum biasing force is not substantially altered; and wherein said limiting step facilitates an increase in the biasing force of said spring above said predetermined minimum by having the intermediate portion of said spring engaged by spaced apart members so that the effective length of the spring between said spaced apart members is less than the length of the spring between the end portions.

* * * * *